(12) United States Patent
Williams

(10) Patent No.: US 6,629,265 B1
(45) Date of Patent: Sep. 30, 2003

(54) RESET SCHEME FOR MICROCONTROLLERS

(75) Inventor: Timothy J. Williams, Bellevue, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/550,834

(22) Filed: Apr. 18, 2000

(51) Int. Cl.⁷ ............................... G06F 1/24; G06F 1/32
(52) U.S. Cl. ........................... 714/23; 714/22; 713/323
(58) Field of Search .................. 714/23, 22, 24; 713/323, 330

(56) References Cited

U.S. PATENT DOCUMENTS

| | | | | |
|---|---|---|---|---|
| 5,203,000 A | * | 4/1993 | Folkes et al. ............... 713/340 |
| 5,649,098 A | * | 7/1997 | Shieh et al. ................. 714/55 |
| 6,076,172 A | * | 6/2000 | Kimura et al. ............... 714/24 |
| 6,178,516 B1 | * | 1/2001 | Meade ........................ 713/340 |
| 6,208,170 B1 | * | 3/2001 | Iwaki et al. ................ 326/121 |
| 6,226,556 B1 | * | 5/2001 | Itkin et al. .................... 700/21 |
| 6,292,038 B1 | * | 9/2001 | Stachura et al. ............. 327/145 |
| 6,367,021 B1 | * | 4/2002 | Shay ........................... 713/300 |
| 6,425,087 B1 | * | 7/2002 | Osborn et al. ............. 713/340 |
| 6,434,395 B1 | * | 8/2002 | Lubin et al. ................ 455/466 |
| 6,442,700 B1 | * | 8/2002 | Cooper ........................ 713/320 |
| 6,457,135 B1 | * | 9/2002 | Cooper ........................ 713/323 |
| 6,472,916 B2 | * | 10/2002 | Mizuno et al. ............. 327/158 |
| 6,504,402 B2 | * | 1/2003 | Horiguchi et al. .......... 326/121 |

* cited by examiner

Primary Examiner—Robert Beausoliel
Assistant Examiner—Anne L. Damiano
(74) Attorney, Agent, or Firm—Christopher P. Maiorana, P.C.

(57) ABSTRACT

An apparatus comprising a first circuit and a second circuit. The first circuit may be configured to precisely generate a reset when the apparatus is in a first operational mode. The second circuit may be configured to generate the reset when the apparatus is in a second operational mode.

19 Claims, 5 Drawing Sheets

US 6,629,265 B1

RESET SCHEME FOR MICROCONTROLLERS

FIELD OF THE INVENTION

The present invention relates to a method and/or architecture for implementing microcontrollers generally and, more particularly, to a method and/or architecture for a reset scheme for microcontrollers.

BACKGROUND OF THE INVENTION

A number of electronic devices generally operate in two modes, (i) active or "normal" operation mode, and (ii) suspend, low-power, or "sleep" mode. Microcontroller circuits are one example of such a device. Conventional microcontrollers may include several types of resets including (i) a power-on initialization reset, (ii) a manual, user-selected reset, and (iii) a single voltage-drop responsive reset. The voltage-drop responsive reset is intended to reset the circuit whenever the power supply voltage drops below a predetermined level (e.g., a brown out event). The predetermined voltage level for resetting is also referred to as the trip point. Conventional reset designs implement one of two types of voltage-drop responsive resets (i) precision resets or (ii) low-power resets. When in the active mode, the reset threshold voltage level needs to have a precise and rapid response in order to maintain data integrity and proper microcontroller operation. When in the suspend mode, data integrity needs to be maintained with very low power dissipation. The reset threshold voltage level can be lower and less precise in the suspend mode than when the microcontroller is in the active mode.

Precision resets operate at precisely determined threshold voltages and respond to rapid supply voltage drops. However, precision resets consume too much power to be practical in the suspend mode. Low-power resets do not provide a robust active mode reset because of (i) lack of trip point precision and (ii) inadequate response speed.

Conventional microcontroller reset circuits using a single reset scheme are not able to support microcontroller data integrity and power consumption requirements for both active and suspend modes. It would be desirable to provide a reset scheme that may support the conflicting needs of (i) precise trip points, (ii) fast response for an active mode operation and/or (iii) low-power consumption for suspend mode support. Such a reset scheme is generally desirable for Universal Serial Bus microcontroller applications and other applications with similar needs.

SUMMARY OF THE INVENTION

The present invention concerns an apparatus comprising a first circuit and a second circuit. The first circuit may be configured to generate a reset when the apparatus is in a first operational mode. The second circuit may be configured to generate the reset when the apparatus is in a second operational mode.

The objects, features and advantages of the present invention include a method and/or architecture that may provide a reset signal that may (i) be completely internal to a circuit, (ii) not require any external components or pins, (iii) maintain data integrity with a precise low-voltage trip point when in an active mode, and/or (iv) implement a low power consumption trip point in suspend mode.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
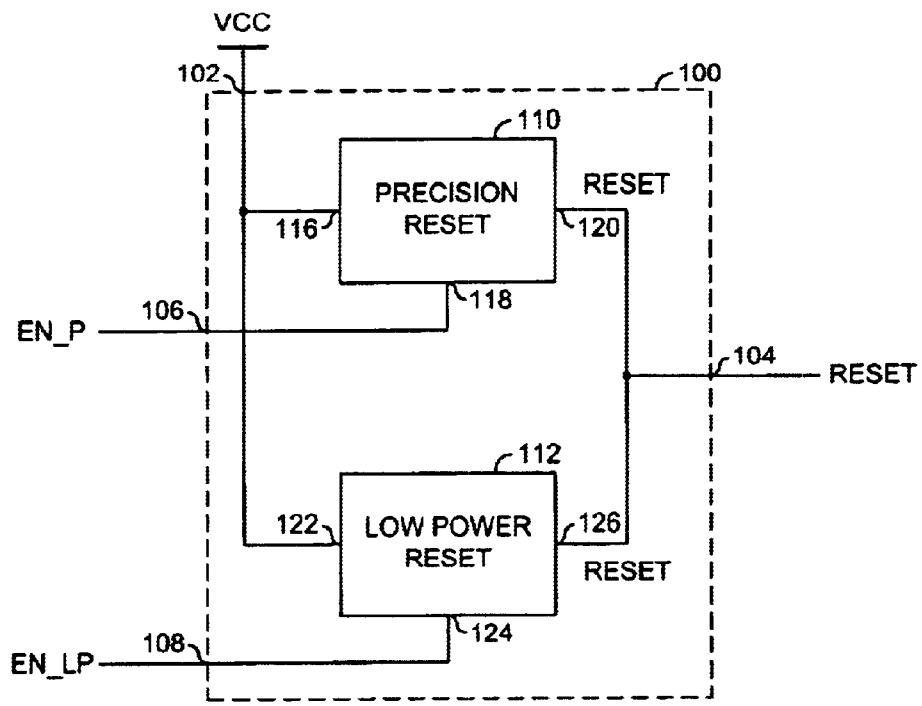
FIG. 1 is a block diagram illustrating a preferred embodiment of the present invention.

Referring to FIG. 1, a block diagram of a circuit 100 is shown in accordance with a preferred embodiment of the present invention. In one implementation, the circuit 100 may comprise a circuit 110 and a circuit 112. The circuit 100 may have an input 102 that may receive a supply voltage (e.g., VCC), an output 104 that may present a signal (e.g., RESET), an input 106 that may receive a control signal (e.g., EN_P), and an input 108 that may receive a control signal (e.g., EN_LP). In one example, the signal RESET may be a reset signal. The signal EN_P may be an enable signal for the circuit 110. The signal EN_LP may be an enable signal for the circuit 112.

The circuit 110 may have an input 116 that may receive the supply voltage VCC, an input 118 that may receive the signal EN_P, and an output 120 that may present the signal RESET. The circuit 112 may have an input 122 that may receive the supply voltage VCC, an input 124 that may receive the signal EN_LP, and an output 126 that may present the signal RESET. The circuits 110 and 112 are generally configured so that the outputs 120 and 126 are at a High-Z (or Tristate) condition when not presenting the signal RESET. Such a High-Z state generally indicates a "don't care" in determining the status of the signal RESET. The outputs 120 and 126 are generally wired together before being presented to the output 104. In general, only one of the circuits 110 and 112 present the signal RESET at a particular time. The circuit 100 may be implemented as a reset circuit for devices that operate in an active mode and in a suspend mode. The circuit 100 may be implemented as a reset circuit for devices that have more than one trip point. The circuit 100 may be, in one example, a microcontroller reset circuit.

In one example, during an active mode of operation, the signal EN_P may be presented to the input 106. When the supply voltage VCC drops below a first predetermined voltage level (e.g., V_TRIP_A) (not shown), the circuit 110 may present the signal RESET. During a suspend mode of operation, the signal EN_LP may be presented to the input 108. When the supply voltage VCC drops below a second predetermined voltage level (e.g., V_TRIP_B) (not shown), the circuit 112 may present the signal RESET. The circuit 110 may be implemented as a precision reset circuit. The circuit 112 may be a low-power reset circuit.

For a Universal Serial Bus (USB) microcontroller application, the circuit 110 may require approximately 2 mA of current and the circuit 112 may require approximately 10 $\mu$A of current. However, other current or power consumption levels may be implemented accordingly to meet the design criteria of a particular implementation. In one example, the first predetermined voltage level V_TRIP_A may be a higher voltage than the second predetermined voltage level V_TRIP_B. For example, the voltage level V_TRIP_B may be a less precisely determined voltage than the voltage level V_TRIP_A. The voltage levels V_TRIP_A and V_TRIP_B may be determined for a particular application. In the example of a USB microcontroller, the first predetermined voltage level may be nominally 3.9V or within a range of 3.7–3.9V. The second predetermined voltage level may be nominally 2V or within a range of 1.7–3V. However, other nominal voltage levels and voltage ranges may be implemented for a particular application. For a particular application, (i) the circuit 110 and the circuit 112 may be individually enabled, (ii) the circuit 110 and the circuit 112 may both be enabled, or (iii) neither the circuit 110 or the circuit 112 may be enabled.

Figure 2:
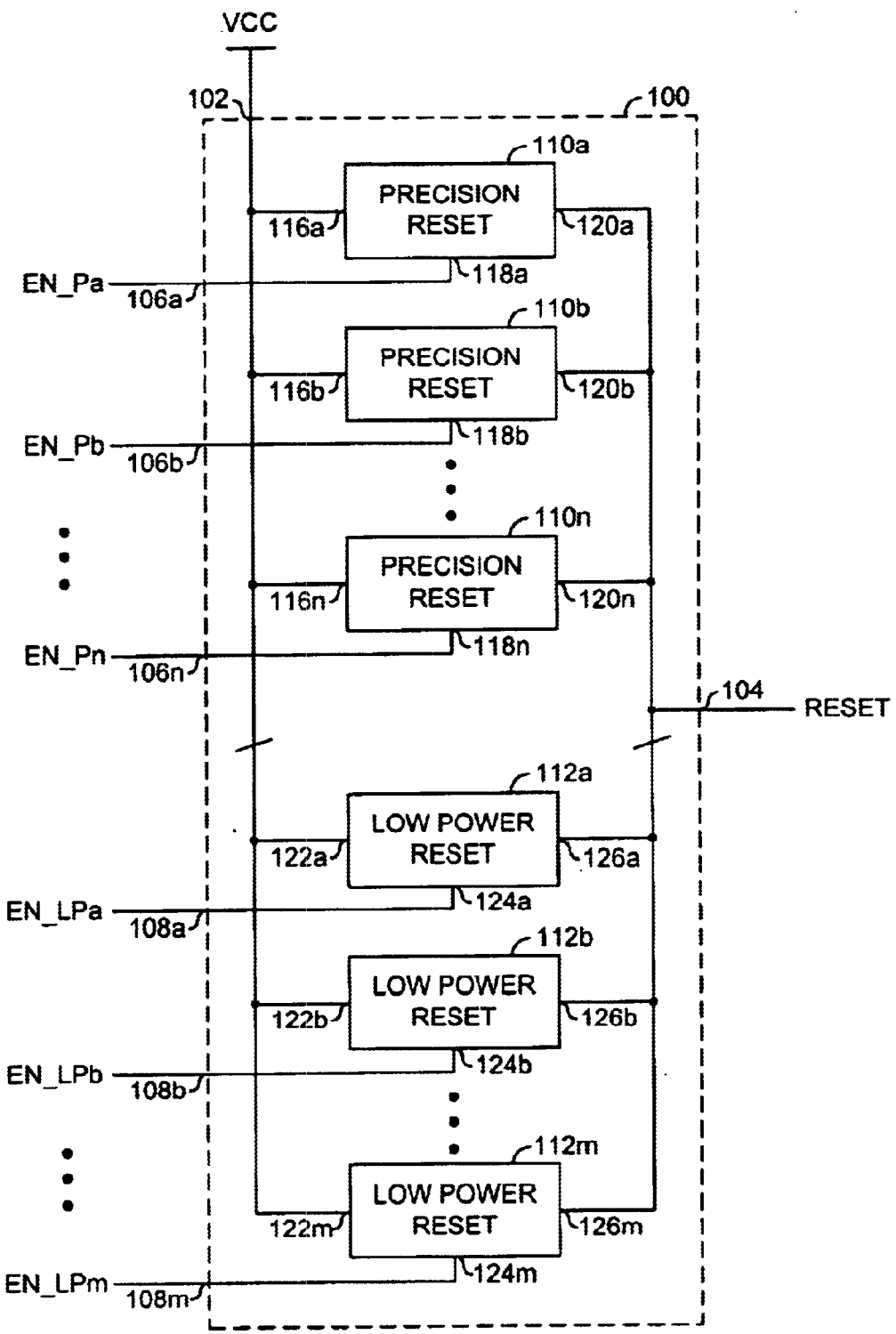
FIG. 2 is a block diagram of an embodiment illustrating a plurality of the circuits of FIG. 1.

Referring to FIG. 2, a block diagram illustrating an example of the circuit 100 implementing a plurality of the circuits 110 (e.g., circuits 110a–110n, where n is an integer) and a plurality of the circuits 112 (e.g., circuits 112a–112m, where m is an integer) is shown. The outputs 120a–120n and 126a–126m are generally wired together before being presented to the output 104. In one example, one or more of a plurality of control signals (e.g., EN_Pa–EN_Pn) may enable the respective circuits 110a–110n. One or more of a plurality of control signals (e.g., EN_LPa–EN_LPm) may enable the respective circuits 112a–112m. A plurality of first predetermined voltage levels (e.g., V_TRIP_Aa–V_TRIP_An), and a plurality of second predetermined voltage levels (e.g., V_TRIP_Ba–V_TRIP_Bm) may implement the trip points for the plurality of circuits 110a–110n and 112a–112m. In general, a number of the circuits 110a–110n and 112a–112m may each receive one of the enable signals EN_Pa–EN_Pn or EN_LPa–EN_LPm. However, (i) the circuits 110a–110n and 112a–112m may be individually enabled, (ii) the circuits 110a–110n and 112a–112m may all be enabled, or (iii) none of the circuits 110a–110n or 112a–112m may be enabled. By implementing the circuit 100 with a plurality of the circuits 110a–110n and 112a–112m, the circuit 100 may be implemented for applications that may have a number of trip voltage level requirements (e.g., circuits with supply voltages of 5V, 3.3V, 2.5V, 1.8V, etc.).

Figure 3:
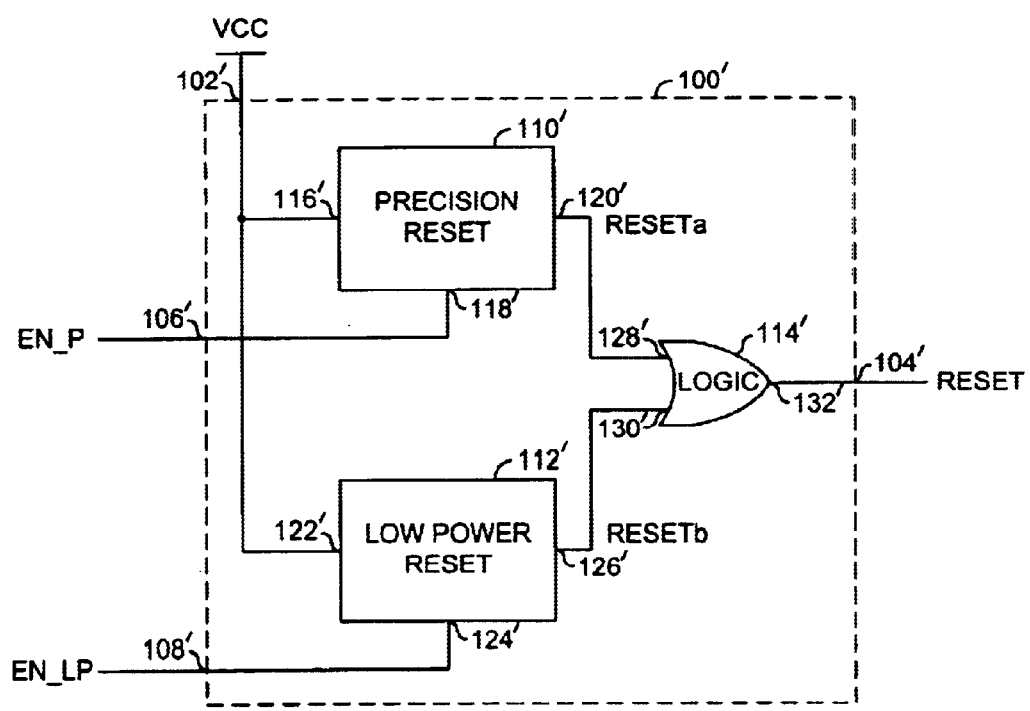
FIG. 3 is a block diagram illustrating an alternative embodiment of the present invention.

Referring to FIG. 3, a circuit 100' illustrating an alternative embodiment of the present invention is shown. The circuit 100' generally comprises a circuit 110', a circuit 112', and a circuit 114'. In one implementation, the circuit 110' may have an output 120' that may present a signal (e.g., RESETa). The circuit 112' may have an output 126' that may present a signal (e.g., RESETb). The circuit 114' may have an input 128' that may receive the signal RESETa, an input 130' that may receive the signal RESETb, and an output 132' that may present the signal RESET. The signal RESETa may be a reset signal responsive to the first predetermined voltage level V_TRIP_A. The signal RESETb may be a reset signal responsive to the second predetermined voltage level V_TRIP_B. The circuit 114' may present the signal RESET in response to the signals RESETa or RESETb. The circuit 114' may be implemented, in one example, as a logic gate, such as an OR gate. In general, the circuit 114' generates the signal RESET when either the signal RESETa or the signal RESETb (or both) are active. However, other logic gates or circuits may be implemented accordingly to meet the design criteria of a particular implementation.

Figure 4:
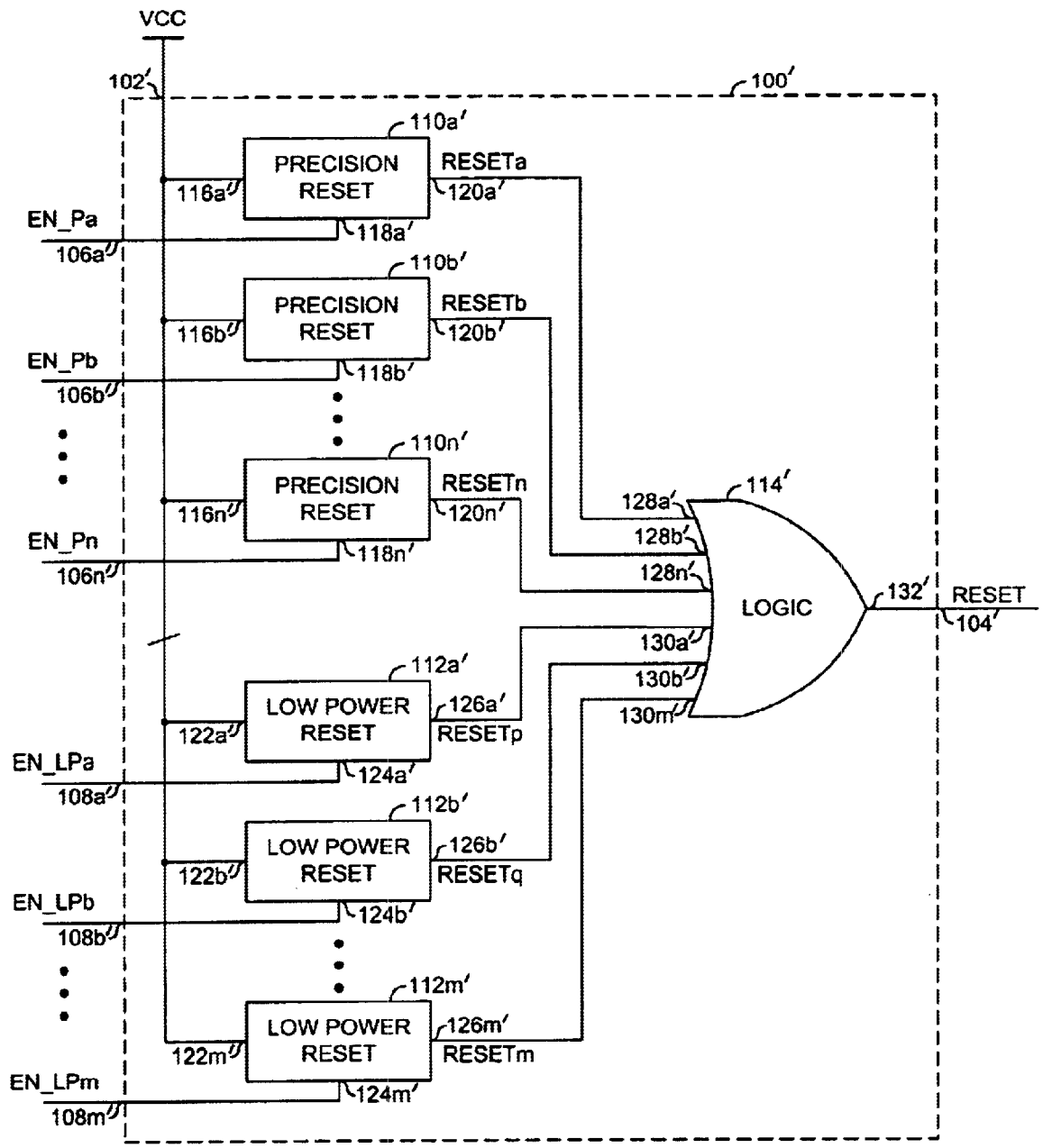
FIG. 4 is a block diagram illustrating an embodiment illustrating a plurality of the circuits of FIG. 3.

Referring to FIG. 4, a block diagram illustrating an example of the circuit 100' implementing a plurality of the circuits 110' (e.g., the circuits 110a'–110n') and a plurality of the circuits 112' (e.g., the circuits 112a'–112m') is shown. The circuits 110a'–110n' generally present a plurality of signals RESETa–RESETn. The circuits 112a'–112m' generally present a plurality of signals RESETp–RESETm. The logic circuit 114' may present the signal RESET in response to a one or more of the signals RESETa–RESETn and RESETp–RESETm. The circuit 114' may be implemented as one or more logic circuits configured to generate a desired logic function. By manipulating a plurality of reset signals RESETa–RESETn and RESETp–RESETm, each generated in response to a plurality of adjustable threshold voltages V_TRIP_Aa–V_TRIP_An and V_TRIP—Bp–V—TRIP_Bm, a variety of design options may be implemented.

Figure 5:
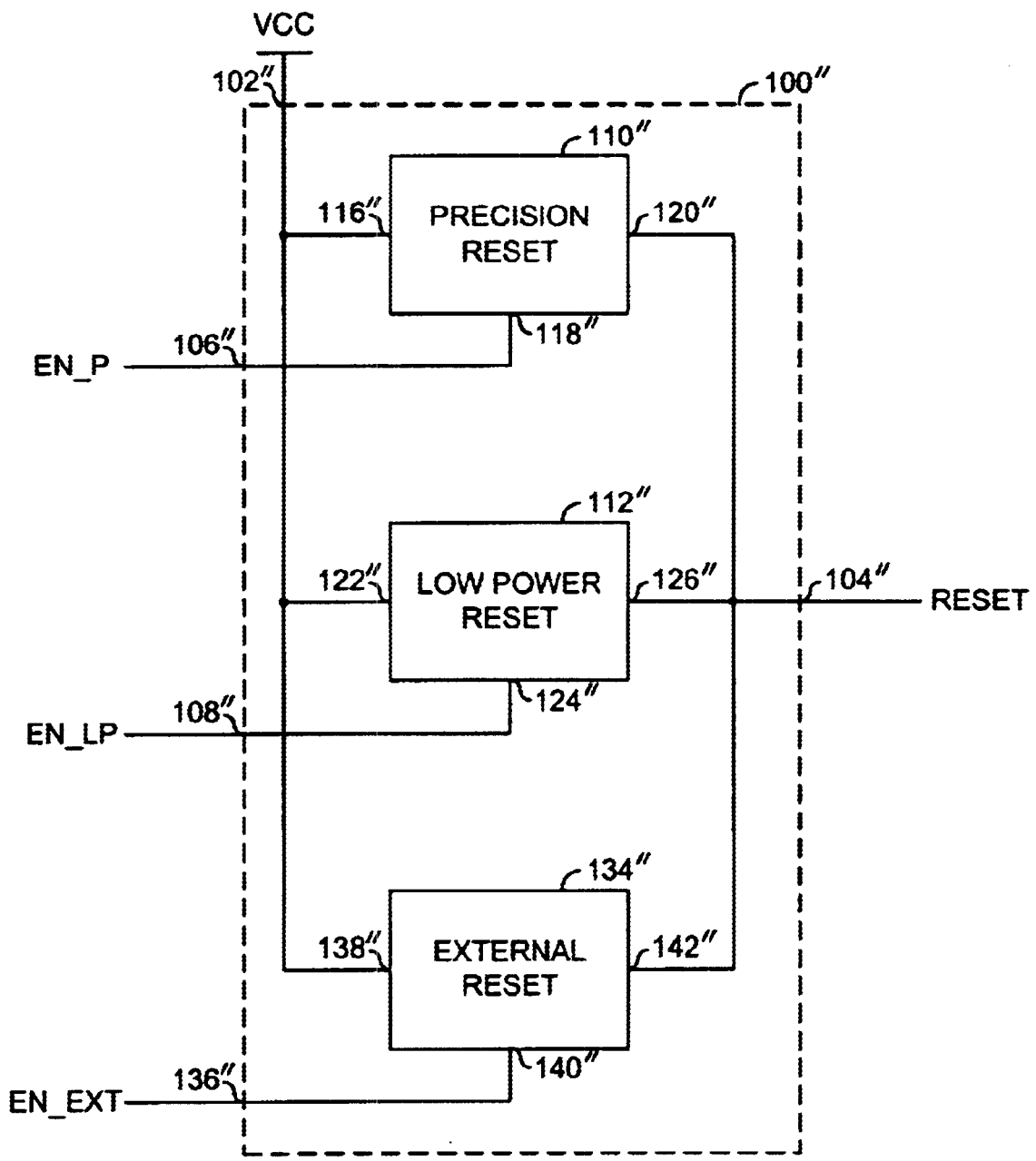
FIG. 5 is a block diagram illustrating another alternative embodiment of the present invention.

Referring to FIG. 5, a block diagram of a circuit 100" illustrating another alternative embodiment of the present invention is shown. In one example, the circuit 100" may be implemented as a circuit 110", a circuit 112", and a circuit 134". The circuit 100" may have an input 136" that may receive a control signal (e.g., EN_EXT). The circuit 134" may have an input 138" that may receive the supply voltage VCC, an input 140" that may receive the signal EN_EXT, and an output 142" that may present the signal RESET. In one example, the signal EN_EXT may enable the circuit 134". The signal EN_EXT may be an external reset signal. The external reset signal may be a user-selected reset, a power-on reset, etc. The circuits 110", 112", and 134" are generally configured such that the outputs 120", 126", and 142" are at a High-Z (or Tristate) condition when not presenting the signal RESET. The outputs 120", 126", and 142" are generally wired together before being presented to the output 104". In general, only one of the circuits 110", 112", and 134" may present the signal RESET at a particular time. During an external reset, the signal EN_EXT may be presented to the input 136".

Figure 6:
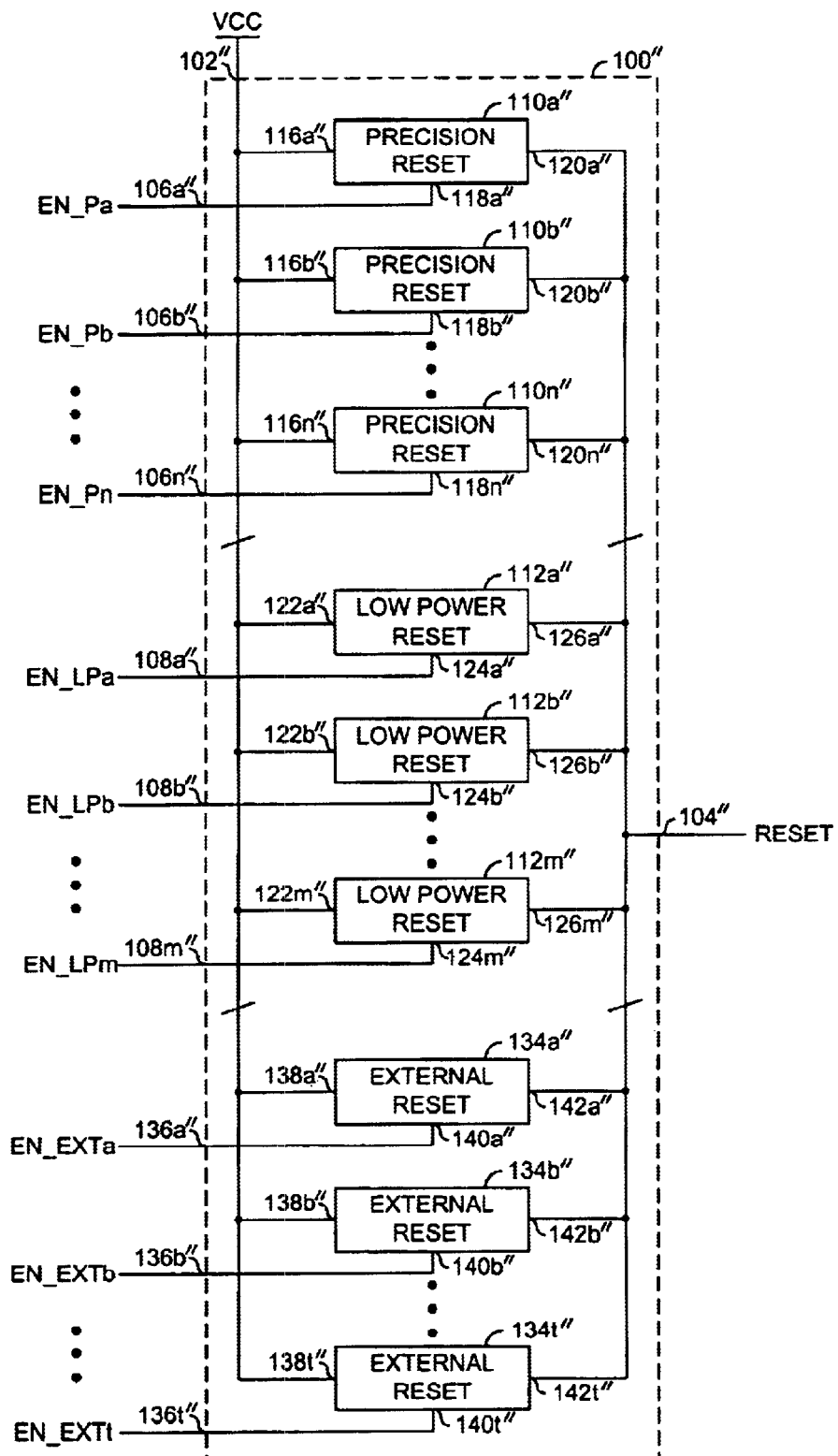
FIG. 6 is a block diagram illustrating an embodiment illustrating a plurality of the circuits of FIG. 5.

Referring to FIG. 6, a block diagram illustrating an example of the circuit 100" implementing a plurality of the circuits 110" (e.g., the circuits 110a"–110n"), a plurality of the circuits 112" (e.g., the circuits 112a"–112m"), and a plurality of the circuits 134" (e.g., the circuits 134a"–134t") is shown. By implementing the plurality of the circuits 110a"–110n", the plurality of the circuits 112a"–112m" and the plurality of the circuits 134a"–134t", a number of reset conditions may be generated in response to a number of external conditions.

The circuit 100" of FIGS. 5 and 6 may be implemented with an appropriate logic circuit (such as the logic circuit 114' of FIG. 3) to generate a single reset signal RESET. Alternately, the circuit 100" may use a tri-state implementation described in connection with FIG. 1.

The various signals are generally "on" (e.g., a digital HIGH, or 1) or "off" (e.g., a digital LOW, or 0). However, the particular polarities of the on (e.g., asserted) and off (e.g., deasserted) states of the signals may be adjusted (e.g., reversed) accordingly to meet the design criteria of a particular implementation.

Implementation of the circuit 100 may provide (i) completely internal resets that do not require any external components or pins, (ii) data integrity with a precise low-voltage trip point in active mode, (iii) resets in a suspend mode, and/or (iv) low power consumption in suspend mode.

While the circuit 100 has been described, in part, in the context of a USB microcontroller implementation, other applications such as an IEEE std 1394 interface may also be implemented. The circuit 100 may be used, in general, for any application where one or more reset modes may be needed. While the circuit 100 has been described in particular for active and suspend modes of operation, other modes of operation may be implemented to meet the design criteria of a particular application. Examples of other modes may include but are not limited to (i) a mode where a precise trip point may not be required and power dissipation may be higher than in a suspend mode, (ii) a mode where the trip point may be a percentage of the supply voltage, (iii) a mode where the trip point range may be a function of clock speed such that when the clock speed is high, the trip point range is narrow and when the clock speed is reduced, the trip point range is more broad, etc. The trip points may be set by a number of methods in order to implement the design criteria of a particular application. Methods of setting trip points may include but are not limited to (i) predetermined circuit parameters used in the design of the circuit 100, (ii) programming during the manufacture of the circuit 100, (iii) user set parameters, etc.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a first circuit configured to precisely generate a reset when said apparatus is in a first operational mode; and
    a second circuit configured to generate said reset when said apparatus is in a second operational mode, wherein said apparatus is configured to operate in (i) said first operational mode in response to a first enable signal and (ii) said second operation mode in response to a second enable signal, wherein only one of said first and second operational modes is active.

2. The apparatus according to claim 1, wherein said reset is generated in response to (i) a supply voltage and a first predetermined voltage level when said apparatus is in said first operational mode, and (ii) said supply voltage and a second predetermined voltage level when said apparatus is in said second operational mode.

3. The apparatus according to claim 1, wherein said first operational mode is an active mode.

4. The apparatus according to claim 2, wherein said first predetermined voltage level comprises an active mode trip voltage level for a microcontroller.

5. The apparatus according to claim 2, wherein said second predetermined voltage comprises a suspend mode trip voltage level for a microcontroller.

6. The apparatus according to claim 1, wherein said second operational mode is a suspend mode.

7. The apparatus according to claim 1, wherein said reset is generated by either said first circuit or said second circuit.

8. The apparatus according to claim 1, wherein said second circuit comprises a low-power reset circuit configured to consume less power than said first circuit.

9. The apparatus according to claim 1, wherein said first and second circuits present a high impedance signal when not generating said reset.

10. The apparatus according to claim 1, wherein said apparatus further comprises:
    a third circuit configured to generate said reset in response to outputs of said first and second circuits.

11. The apparatus according to claim 10, wherein said third circuit comprises an OR gate.

12. The apparatus according to claim 10, further comprising a fourth circuit configured to generate said reset in response to an external control signal.

13. The apparatus according to claim 10, wherein said third circuit comprises a plurality of third circuits each configured to generate said reset.

14. The apparatus according to claim 1, wherein said first circuit comprises a plurality of first circuits each configured to generate said reset.

15. The apparatus according to claim 1, wherein said second circuit comprises a plurality of second circuits each configured to generate said reset.

16. An apparatus comprising:
    means for generating a reset in response to a supply voltage and a first predetermined voltage level when said apparatus is in a first operational mode; and
    means for generating said reset in response to said supply voltage and a second predetermined voltage level when said apparatus is in a second operational mode, wherein said apparatus is configured to operate in (i) said first operational mode in response to a first enable signal and (ii) said second operation mode in response to a second enable signal, wherein only one of said first and second operational modes is active.

17. The apparatus according to claim 1, wherein said first circuit comprises a precision reset circuit.

18. The method for generating a reset in a device, comprising the steps of:
    (A) generating a reset in response to a first predetermined voltage level when said device is in said first operational mode; and
    (B) generating said reset in response to a second predetermined voltage level when said device is in said second operational mode, wherein said method operates in (i) said first operational mode in response to a first enable signal and (ii) said second operation mode in response to a second enable signal, wherein only one of said first and second operational modes is active.

19. The method according to claim 18, wherein said device comprises a microcontroller.

* * * * *